US008842086B2

(12) United States Patent
Ogg

(10) Patent No.: US 8,842,086 B2
(45) Date of Patent: Sep. 23, 2014

(54) MOBILE TERMINAL HAVING HAPTIC DEVICE AND FACILITATING TOUCH INPUTS IN THE FRONT AND OR BACK

(75) Inventor: Anthony Ogg, New York, NY (US)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 13/252,920

(22) Filed: Oct. 4, 2011

(65) Prior Publication Data
US 2013/0002570 A1    Jan. 3, 2013

Related U.S. Application Data

(60) Provisional application No. 61/503,527, filed on Jun. 30, 2011.

(51) Int. Cl.
*G06F 3/041* (2006.01)
*G06F 3/01* (2006.01)

(52) U.S. Cl.
CPC ........................................ *G06F 3/016* (2013.01)
USPC .......................................... 345/173; 345/156

(58) Field of Classification Search
USPC ........ 310/331; 340/407.2; 345/156, 168, 173, 345/174; 434/113
See application file for complete search history.

(56) References Cited

U.S. PATENT DOCUMENTS

| 2007/0152974 | A1* | 7/2007 | Kim et al. ...................... 345/168 |
| 2009/0033617 | A1* | 2/2009 | Lindberg et al. .............. 345/156 |
| 2009/0160810 | A1* | 6/2009 | Liu et al. ........................ 345/173 |
| 2009/0174687 | A1* | 7/2009 | Ciesla et al. ................... 345/174 |
| 2009/0303175 | A1* | 12/2009 | Koivunen ....................... 345/156 |
| 2010/0177050 | A1* | 7/2010 | Heubel et al. ................. 345/173 |

FOREIGN PATENT DOCUMENTS

| KR | 10-2010-0007383 | 1/2010 |
| KR | 1020110021480 | 3/2011 |
| KR | 1020110029437 | 3/2011 |

OTHER PUBLICATIONS

Vidal-Verdu et al., "Thermopneumatic Actuator for Tactile Displays and Smart Actuation Circuitry", Jul. 1, 2005, vol. 5836 of SPIE.*
Yang et al., "Development of a Miniature Pin-Array Tactile Module using Elastic and Electromagnetic Force for Mobile Devices", presented at the Third Joint Eurohaptics Conference and Symposium on Haptic Interfaces for Virtual Environment and Teleoperator Systems on Mar. 18-20, 2009.*
Parris S. Wellman et al., "Mechanical Design and Control of a High-Bandwidth Shape Memory Alloy Tactile Display", presented at the International Symposium on Experimental Robotics, Barcelona, Spain on Jun. 1997.*

(Continued)

*Primary Examiner* — Dwayne Bost
*Assistant Examiner* — Sepehr Azari
(74) *Attorney, Agent, or Firm* — Lee, Hong, Degerman, Kang & Waimey

(57) ABSTRACT

A mobile terminal as broadly described herein may comprise a terminal body including a display module, a touch sensor disposed to overlap the display module and configured to be touch sensitive, haptic modules mounted at the body, and a controller configured to feed a current to at least one of the haptic modules when the touch sensor senses a touch input. Each haptic module may include a chamber covered by a flexible membrane and an actuating module accommodated in the chamber and configured to press the flexible membrane based on an energy conversion of the current such that the flexible membrane is expanded.

23 Claims, 16 Drawing Sheets

(56) References Cited

OTHER PUBLICATIONS

In the Korean Intellectual Property Office Application Serial No. 10-2011-0086063, Office Action dated Sep. 27, 2012, 4 pages.

Korean Intellectual Property Office Application Serial No. 10-2011-0086063, Notice of Allowance dated Feb. 1, 2013, 3 pages.

* cited by examiner

MOBILE TERMINAL HAVING HAPTIC DEVICE AND FACILITATING TOUCH INPUTS IN THE FRONT AND OR BACK

CROSS-REFERENCE TO RELATED APPLICATIONS

Pursuant to 35U.S.C. §119(e), this application claims the benefit of U.S. Provisional Patent Application Ser. No. 61/503,527, filed on Jun. 30, 2011, the contents of which are incorporated by reference herein in their entirety.

BACKGROUND OF THE INVENTION

1. Field of the Invention

The present disclosure relates to a mobile terminal having a haptic device.

2. Description of Related Art

Terminals can be classified into two types including a mobile terminal and a stationary terminal. Furthermore, the mobile terminal can be further classified into two types including a handheld terminal and a vehicle mounted terminal.

Over time, these terminals have become multifunctional, such that they have the ability to capture still images or moving images, play music or video files, play games, receive broadcast and the like. These terminals are often referred to as multimedia players.

In order to implement the complex function of a multimedia player, various attempts have been applied in the aspects of hardware and software implementation. As an example, a user interface environment is provided for the user to easily or conveniently retrieve or select a function.

Furthermore, because a mobile terminal is considered as a personal belonging for expressing one's own personality, various design forms are required. The design forms include structural changes and improvements for the user to more conveniently use the mobile terminal. The performance enhancement of a haptic device may be considered as one of such structural changes and improvements.

BRIEF SUMMARY OF THE INVENTION

The present disclosure is to provide a mobile terminal having a haptic device with a better tactile performance.

The present disclosure relates to a haptic device generating not only tactile effects but also various visible effects which a user can feel.

In order to accomplish the foregoing objective, a mobile terminal may include a terminal body including a display module, a touch sensor disposed to overlap the display module and configured to be touch sensitive, haptic modules mounted at the body, and a controller configured to feed a current to at least one of the haptic modules when the touch sensor senses a touch input. Each haptic module may include a chamber covered by a flexible membrane and an actuating module accommodated in the chamber and configured to press the flexible membrane based on an energy conversion of the current such that the flexible membrane is expanded.

As an example associated with the present disclosure, the actuating module may include a phase-change material, a heating element and a metal member. The phase-change material is filled in the chamber. The heating element is accommodated in the chamber, and configured to heat the phase-change material based on the energy conversion. The metal member is disposed in the chamber so as to cool the phase-change material when the feeding of the current is stopped.

As an example associated with the present disclosure, the actuating module may include an induction coil and a piston. The induction coil is accommodated in the chamber and configured to generate a magnetic force when the current is fed thereinto. The piston is disposed in the induction coil, and configured to move so as to press the flexible membrane based on the magnetic force.

As an example associated with the present disclosure, the actuating module may include an elastomer and a supporting member. The elastomer is disposed in the chamber. The supporting member is supported to the elastomer and is configured to raise the elastomer toward the flexible membrane when the current is applied thereinto.

As an example associated with the present disclosure, the display module is positioned to be viewable from the front side of the body, and the haptic modules are arranged on the rear side in a matrix form.

As an example associated with the present disclosure, the each haptic module is disposed in a case of the body, and is configured to press the case or a window mounted at the case when the touch sensor senses the touch input.

As an example associated with the present disclosure, a moving unit is movably mounted at a case of the body, and the haptic modules are covered by the moving unit. The moving unit may be configured to receive a push input.

As an example associated with the present disclosure, the display module may include a flexible display for outputting visible information. The flexible membrane is disposed below the flexible display so as to press the flexible display when the touch sensor senses a touch input.

Alternatively, a mobile terminal may comprise a body including a front side and a rear side, a display module positioned to be viewable from the front side of the body, a touch sensor disposed to overlap the display module and configured to be touch sensitive, and a haptic device including haptic modules arranged on the rear side of the body in a matrix form. The haptic device is controlled such that at least one of haptic modules reacts to a touch input.

As an example associated with the present disclosure, the haptic device is sized to be proportional to the display module or to overlap the display module. Furthermore, each haptic module may comprises a chamber covered by a flexible membrane and an actuating module accommodated in the chamber and configured to press the flexible membrane such that the flexible membrane is expanded. The flexible membrane is disposed at the rear side, and at least one of protrusions is formed at the rear side based on an expansion of the flexible membrane when the touch sensor detects to the touch input.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Hereinafter, a mobile terminal associated with the present invention and a method of manufacturing a display module thereof will be described in more detail with reference to the accompanying drawings. A suffix "module" or "unit" used for constituent elements disclosed in the following description is merely intended for easy description of the specification, and the suffix itself does not give any special meaning or function. A mobile terminal disclosed herein may include a portable phone, a smart phone, a laptop computer, a digital broadcast terminal, a personal digital assistant (PDA), a portable multimedia player (PMP), a navigational device, and the like.

Figure 1:
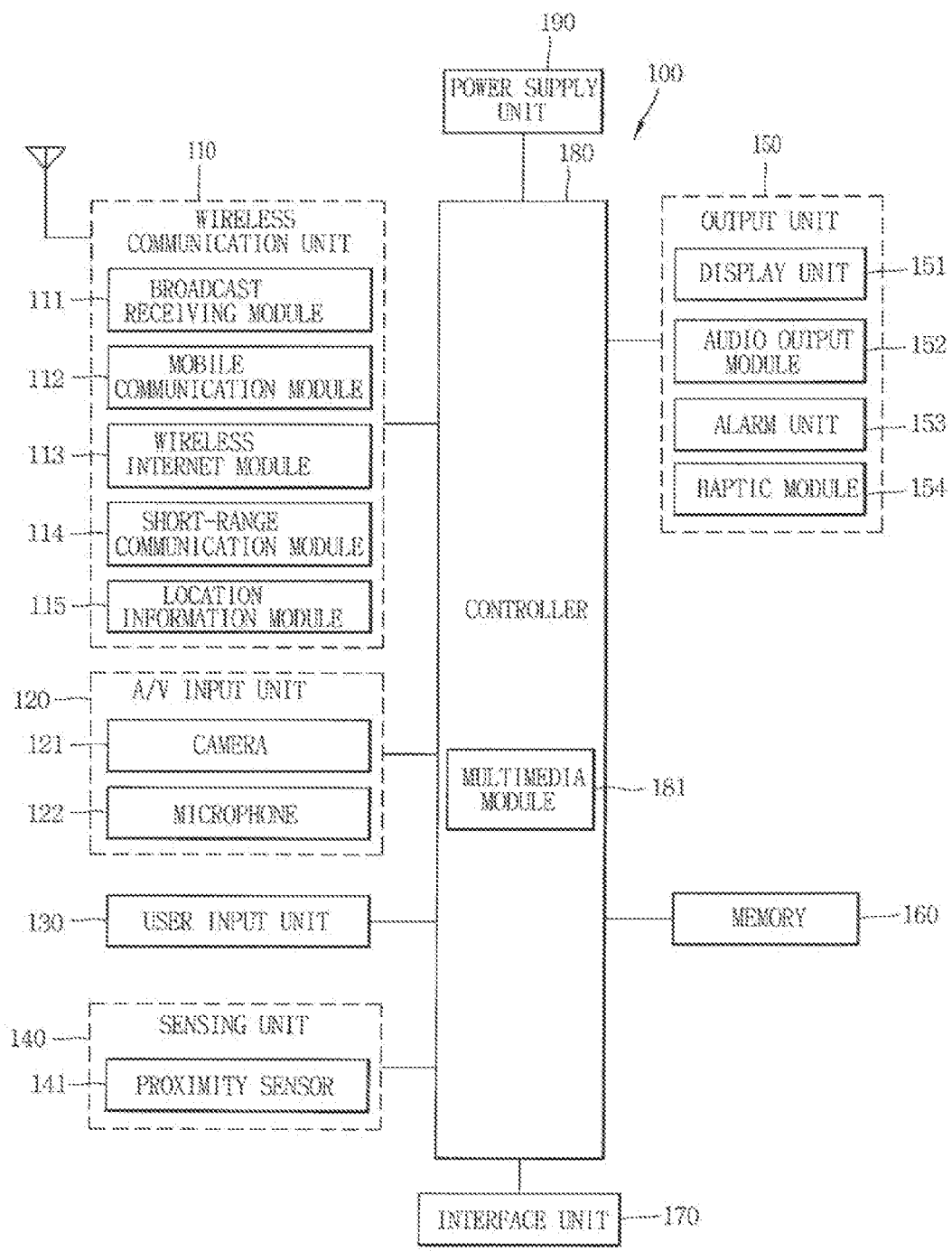
FIG. 1 is a block diagram illustrating a mobile terminal associated with an embodiment of the present invention.

FIG. 1 is a block diagram illustrating a mobile terminal associated with an embodiment of the present invention. The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast signal and/or broadcast-associated information received through the broadcast receiving module 111 may be stored in the memory 160.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HS-DPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module.

Referring to FIG. 1, the A/V input unit 120 receives an audio or video signal, and the A/V input unit 120 may include a camera 121, a microphone 122 and the like. The camera 121 processes an image frame, such as still picture or video, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI. The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such displays may be called transparent displays. An example of a typical transparent display may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces. In embodiments where the display unit 151 and a touch sensitive sensor (referred to as a touch sensor) have an interlayer structure, the structure may be referred to as a touch screen. The display unit 151 may be used as an input device in addition to being used as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer. The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode, a broadcast reception mode, and the like. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include a call signal received, a message received, a key signal input, a touch input, and the like. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner. The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like. The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image. The power supply unit 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
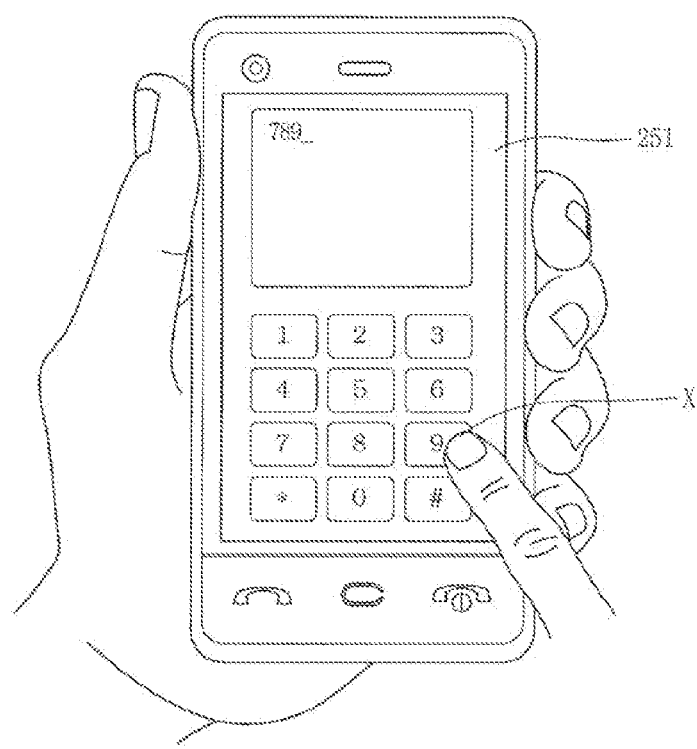
FIGS. 2A and 2B are conceptual views illustrating an operation example of a haptic device according to the present invention.
Figure 2B:
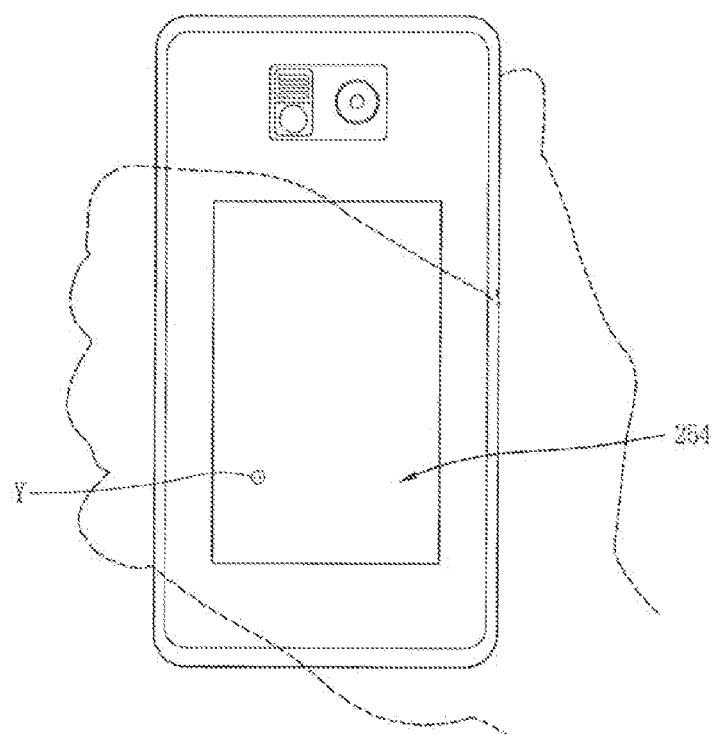

The present disclosure is to provide a haptic device for enhancing tactile performance or having visible effects. FIGS. 2A and 2B are conceptual views illustrating an operation example of the haptic device according to the present invention.

Referring to FIG. 2A, a mobile terminal is provided with a display module 251 disposed on one surface, e.g., a front surface thereof. The display module 251 may have a touch sensor for detecting a touch input thereon. On the display module 251, visible information may be implemented in the form of images, texts, icons, etc. Referring to FIG. 2B, a haptic device 254 for generating various tactile effects may be additionally mounted on other surface, e.g., a rear surface thereof. The haptic device 254 may be configured to transmit tactile effects (signals) through a user's direct contact, or a user's muscular sense using a finger or a hand. Furthermore, the haptic device 254 may be configured in an impact type.

For instance, once a user touches an icon (a virtual key) on a specific point ('X') at the display module 251, a vertical impact on the rear surface is generated at a specific point ('Y') by the haptic device 254. The user can feel tactile effects at the specific point ('Y') corresponding to the specific point ('X') through the vertical impact. Referring to FIG. 2B again, the vertical impact is implemented by an expansion of a haptic device. Under this configuration, a protrusion is generated on the specific point ('Y') for a moment. Therefore, the user can see an operation of the haptic device 254.

Figure 3A:
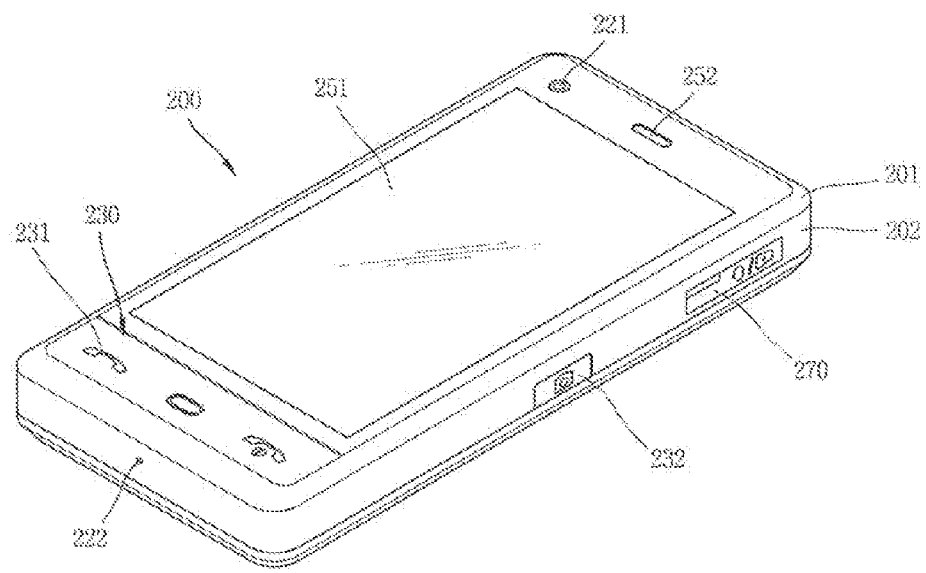
FIG. 3A is a front perspective view illustrating an example of a mobile terminal associated with the present invention.
Figure 3B:
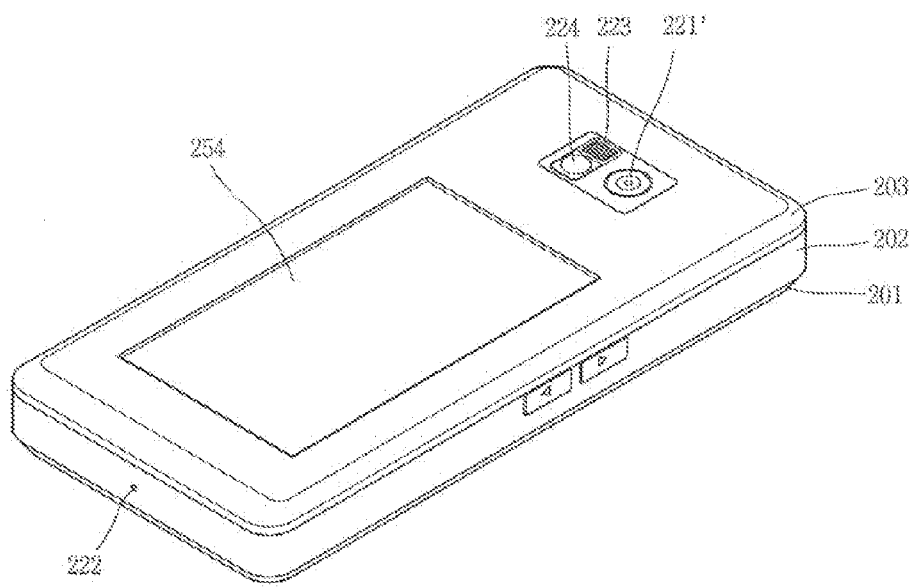
FIG. 3B is a rear perspective of the mobile terminal of FIG. 3A.

Hereinafter, a hardware configuration of the mobile terminal which can execute the operations of FIG. 2A and FIG. 2B will be explained in more details. FIG. 3A is a front perspective view illustrating an example of a mobile terminal associated with the present invention, and FIG. 3B is a rear perspective view illustrating a mobile terminal illustrated in FIG. 3A. The mobile terminal disclosed herein is provided with a bar-type terminal body. However, the present invention is not limited to this type of terminal, but is also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 201 and a rear case 202. The cover 203 may be mounted at rear case 202. At least one intermediate case may be additionally disposed between the front case 201 and the rear case 202. The cases may be formed by injection-molding a synthetic resin or may be also formed of a metal material such as stainless steel (STS), titanium (Ti), or the like.

A display module 251, an audio output module 252, a camera 221, a user input unit 230, a microphone 222, and the like may be arranged on the terminal body, mainly on the front case 201. The display module 251 may occupy most of a major portion of the front case 201. The audio output unit 252 and the camera 221 are disposed at a region adjacent to one end of the display module 251, and the user input unit 231 and the microphone 222 are disposed at a region adjacent to the other end thereof. The user interface 232 and the interface 270, and the like, may be disposed on a lateral surface of the front case 201 and the rear case 202.

The user input unit 230 is manipulated to receive a command for controlling the operation of the portable terminal, and may include a plurality of manipulation units 231, 232. The manipulation units 231, 232 may be commonly designated as a manipulating portion, and any method may be employed if it is implemented in a tactile manner allowing the user to perform manipulation with a tactile feeling.

The content inputted by the manipulation units 231, 232 may be set in various ways. For example, the first manipulation unit 231 may be used to receive a command, such as start, end, scroll, 3D browser execution, or the like, and the second manipulation unit 232 may be used to receive a command, such as controlling a volume level being outputted from the audio output unit 252, or switching it into a touch recognition mode of the display module 251. The display module 251 together with a touch sensor 251c (see FIG. 4) may form a touch screen, and the touch screen may function as the user input unit 230.

As shown in FIG. 3B, a camera 221' may be additionally mounted on a rear surface of the terminal body, namely, the rear case 202. The camera 221' has an image capturing direction, which is substantially opposite to the direction of the camera 221 (refer to FIG. 3A), and may have different pixels from those of the first video input unit 221. For example, it is preferable that the camera 221 has a relatively small number of pixels enough not to cause a difficulty when the user captures his or her own face and sends it to the other party during a video call or the like, and the camera 221' has a relatively large number of pixels since the user often captures a general object that is not sent immediately. The cameras 221, 221' may be provided in the terminal body in a rotatable or pop-out manner.

In addition, a flash 223 and a mirror 224 may be disposed adjacent to the camera 221'. The flash 223 illuminates light toward an object when capturing the object with the camera 221'. The mirror 224 allows the user to look at his or her own face, or the like, in a reflected way when capturing himself or herself (in a self-portrait mode) by using the camera 221'.

An audio output unit 252' may be disposed on a rear surface of the terminal body. The audio output unit 252' together with the audio output unit 252 (refer to FIG. 3A) can implement a stereo function, and it may be also used to implement a speaker phone mode during a phone call. An antenna 216 for receiving broadcast signals may be additionally disposed on a lateral surface of the terminal body. The antenna 216 constituting a broadcast receiving module 111 (refer to FIG. 1) may be provided so as to be pulled out from the terminal body. A power supply unit for supplying power to the portable terminal 200 may be mounted on a rear surface of the terminal body. The power supply unit may be configured so as to be incorporated in the terminal body or directly detachable from the outside of the terminal body.

A haptic device 254 for generating tactile and visible effects may be additionally mounted on the rear case 202. For example, the haptic device 254 incudes arrangement of haptic modules vertically expanding with respect to the rear case 202. In this case, the haptic device 254 may be configured to output visual information recognized through the expansion. Hereinafter, the haptic device will be described in more detail.

Figure 4:
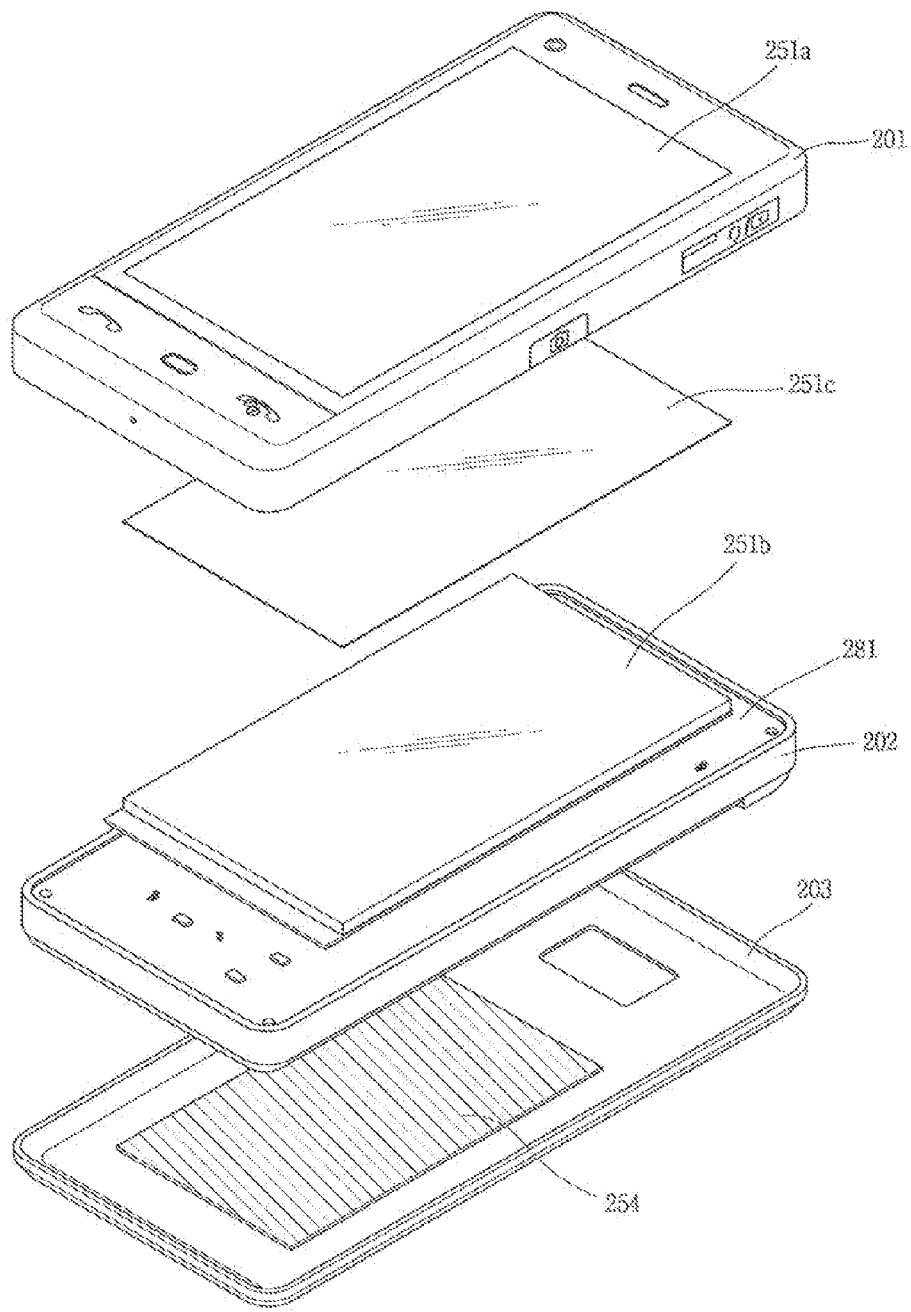
FIG. 4 is an exploded view of the mobile terminal of FIG. 3A.
Figure 5:
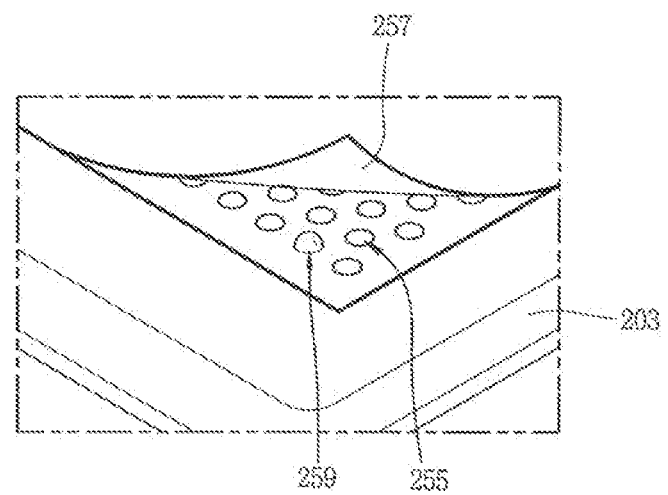
FIG. 5 is an enlarged view illustrating a haptic device in FIG. 4.

FIG. 4 is an exploded view of the mobile terminal of FIG. 3A, FIG. 5 is enlarged views illustrating a haptic device in FIG. 4, and FIG. 6A through 6C are cross-sectional views for illustrating an operation of a haptic device of FIG. 5.

Referring to FIG. 4, a window 251a is combined with a surface of the front case 201. The window 251a is configured with a light transmittable material, for example, light-transmittance plastic, tempered glass, and the like. However, the window 251a may include a portion incapable of transmitting light. A display 251b may be mounted at a rear surface of the window 251a for displaying visual information in such a manner that the display 251b is covered by the window 251a. The display 251b may be any one of a Liquid Crystal Display (LCD), a Thin Film Transistor-LCD (TFT-LCD), an Organic Light Emitting Diode (OLED) display, and a three-dimensional (3D) display, and the like. At least a portion of the window 251a capable of transmitting light may have an area corresponding to the display 251b. Through this portion of the window 251a the user may recognize visual information displayed on the display 251b from the outside.

A circuit board 281 may be mounted in the rear case 202. The circuit board 281 may be configured as the controller 180 (see FIG. 1) for performing various functions of the mobile terminal. An audio output element corresponding to the audio output unit, a camera, and the like, may be mounted on the circuit board 281. For example, the audio output element may be a speaker, a receiver, or the like.

A touch sensor 251c configured to be touch sensitive may be disposed to overlap the display module 251(see FIG. 3A). In more detail, a touch sensor 251c is mounted on the window 251a. The touch sensor 251c may be mounted on a rear surface (or a front surface) of the window 251a and a portion of the window 251a through which light is transmitted may form a region capable of transmitting an input to the touch sensor 251c. The touch sensor 251c made of a light-transmittance material transforms a change in voltage, capacitance, or the like generated at a specific portion of the window 251a into an electrical input signal to detect a touch input. In this exemplary embodiment, a window 251a, a touch sensor 251c, and a display 251b may be configured as the display module 251, and the display module 251 will be operated as a touch screen.

Referring to FIGS. 4 and 5, the haptic device 254 is mounted in a cover 203. The cover 203 may be a battery cover formed to cover a battery. Furthermore, the cover may be configured as the rear case 202. The haptic device 254 includes haptic modules arranged on the rear side of the terminal body in a matrix form. The haptic device 254 is controlled by the controller 180 such that at least one of haptic modules reacts to a touch input. Each haptic module comprises a chamber 255 and an actuating module 256.

The chamber 255 may be implemented in a cell type having empty space defined party walls. The chamber 255 is mounted at other circuit board 282 connected to the circuit board 281. The circuit boards 281, 282 may be configured as the controller 180 for performing haptic functions of the mobile terminal. The controller 180 feeds a current to at least one of the haptic modules when the touch sensor 251c senses the touch input.

The chamber 255 is covered by a flexible membrane 257. The flexible membrane 257 may be a silicon membrane, urethane membrane, and so on. The flexible membrane 257 is configured to cover an end of the party walls. Also, the flexible membrane 257 is disposed to face an inner surface of the cover 203 as a stand-alone accessory that will be used in conjunction with the mobile terminal. Further, the flexible membrane 257 can be built into the cover 203, and may be exposed outwardly in state of mounting the cover 203 as shown in FIG. 5.

The actuating module 256 is accommodated in the chamber 255 and configured to press the flexible membrane 257 based on an energy conversion of the current such that the flexible membrane 257 is expanded. Referring to FIG. 5, and FIGS. 6A through 6C, the actuating module 256 includes a phase-change material 256a and a heating element 256b.

The phase-change material 256a is filled completely or almost completely in the chamber 255. The phase-change material 256a is a material to absorb or emit energy as its phase changes. The phase-change material 256a may be any liquid that can change phase from liquid to gas via heat, such as water, oil, a magneto-rheological liquid, an electro-rheological liquid, an alcohol-based liquid, or other suitable liquid medium. If the alcohol-based liquid is used, the highest operating temperature of the chamber will be about 56~57° C., and this temperature is only measurable where the liquid directly contacts the heat element.

When the phase-change material 256a absorbs energy for the phase change from the liquid to a gas, a volume of the phase-change material 256a increases, which allows the chamber 255 to be expanded.

The energy for the phase change is heat generated by the heating element 256b. The heating element 256b is accommodated in the chamber, and configured to heat the phase-change material based on the energy conversion of the current. The heating element 256b may be configured to conduct the energy conversion based on a thermoelectric effect. The thermoelectric effect is the direct conversion of electric voltage to temperature differences and vice-versa. For example, the heating element 256b may be a micro-heating element, a thermoelectric element (peltier component, TEC), and etc.

Figure 6A:
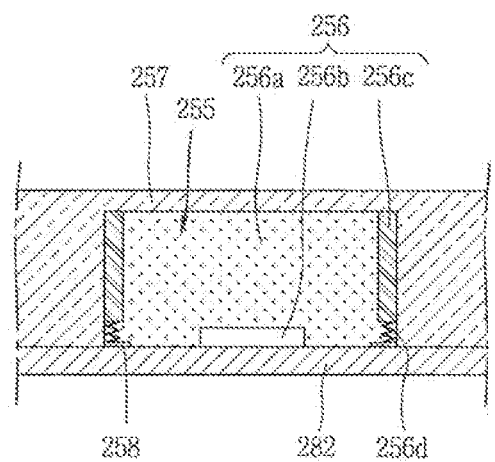
FIG. 6A through 6C are cross-sectional views for illustrating an operation of a haptic device of FIG. 5.
Figure 6B:
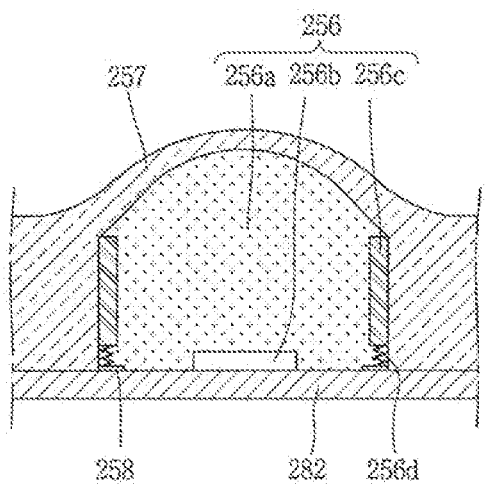
Figure 6C:
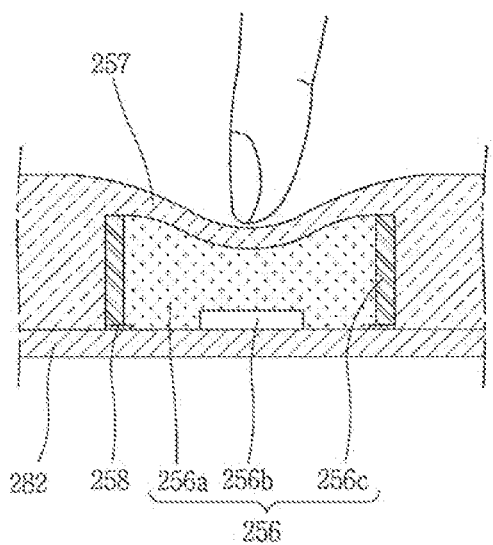

In more detail, referring to FIG. 6A and 6B, the heating element 256b is configured to make an instantaneous phase change of the phase-change material from a liquid to a gas when the current is applied to the heat element 256b. For instance, when current is applied to the heating element 256b via signals from the touch sensor 251c and the controller 180, the heating element 256b makes an instantaneous phase change of the liquid in the chamber 255. As the liquid flashes to the gas, the flexible membrane 257 expands.

The metal member 256c may be disposed in the chamber 255 so as to cool the phase-change material 256a when the feeding of the current is stopped. In more detail, the metal member 256c is formed in a ring shape and cools the gas to liquid in an instantaneous phase change when current is removed.

As shown in FIGS. 5 and 6 with FIGS. 2A and 2B again, the haptic device 254 is sized to be proportional to the display module 251. On the other hand, the haptic device 254 may be sized to substantially overlap the display module 251. A haptic module close to a touched position among haptic modules reacts to the touch input, which allows true haptic device that reacts at a point corresponding to the touched position to be implemented.

The flexible membrane 257 may be an integrated or applied membrane that will provide actuated touch pixels to the mobile terminal. If the flexible membrane 257 is a part of the cover 203 or if the flexible membrane 257 is a stand-alone accessory and the cover 203 is made of a soft material, a protrusion may be protruded at a point corresponding to the expanded chamber 255, which allows the user to feel visible effects as a haptic function. The protrusion is implemented in a protruded pixel 259 in the flexible membrane 257.

The flexible membrane 257 is controlled via receiving signals either from the mobile terminal it is paired with or any external device that has a communication link to the controller 180. Communication can be either mono-directional or bi-directional. The flexible membrane 257 and the controller 180 are designed to be backwards compatible, allowing any mobile terminal communication in mono-directional signal. Terminals with compatible membrane hardware will be prepared for bi-directional.

In single terminal, specifically for the mono-directional communication, input from the touch screen is translated to a physical output on the flexible membrane 257. Specifically for the bi-directional communication, both screen and membrane can either be a device receiving a user's input and outputting a reaction related to the input. Further, the bi-directional communication can be applied to an operation between membrane to membrane, touch screen to membrane, or any combination allowed with both screen and membrane.

Referring to FIGS. 6B and 6C again, the actuating module 256 further includes contact terminals 258 configured to send a signal to the controller 180 when the contact terminals 258 are electrically connected to each other. Furthermore, the metal member 256c is supported by a spring 256d toward the flexible membrane 257, and is configured to be movable in the chamber 255 such that the contact terminals 258 are electrically connected or disconnected to each other.

To send a signal via the chamber 255, a user may push down on the flexible membrane 257. When the metal member 256c touches with the contact terminals 258 by moving in a downward direction, the circuit is closed and sends the signal to the controller 180. Therefore, the metal member 256c is both a heat sink and a conductive bridge for input switching.

Hereinafter, as other embodiments of the present invention, other structures of the haptic device will be described. The same configurations as the configurations aforementioned with reference to FIGS. 5 through 6C will not be explained for brevity.

Figure 7A:
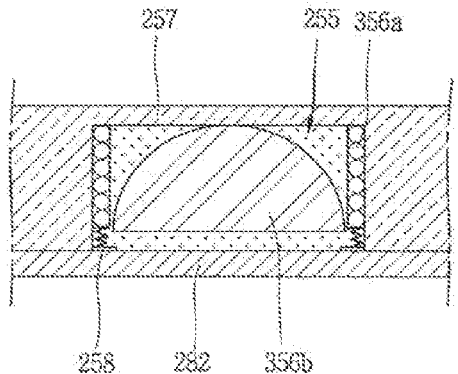
FIGS. 7A through 7C are cross-sectional views illustrating another embodiment of a haptic device according to the present invention.
Figure 7B:
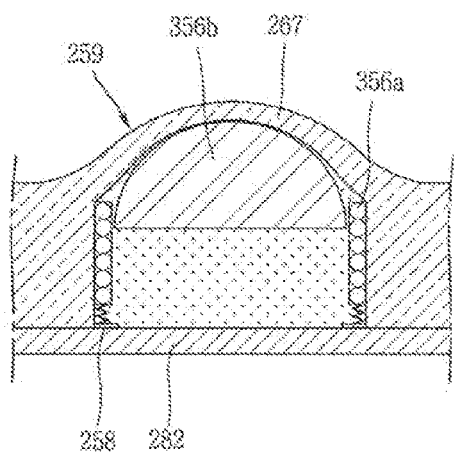
Figure 7C:
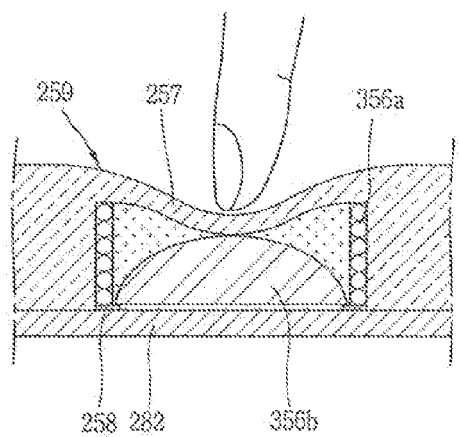

FIGS. 7A through 7C are cross-sectional views illustrating another embodiment of a haptic device according to the present invention. Referring to these figures, an actuating module includes an induction coil 356a and a piston 356b.

The induction coil 356a is accommodated in a chamber 255 and configured to generate a magnetic force when a current is fed into the induction coil 356a. The current is controlled by the controller 180 (refer to FIG. 1), and is fed to the induction coil 356a, if the touch sensor 251c detects a touch input. The piston 356b is disposed in the induction coil 356a, and configured to move so as to press the flexible membrane 257 based on the magnetic force. The piston 356b is configured to press the flexible membrane 257 when the piston 356b is driven upward.

In more detail, when current is applied to the induction coil 356a, the piston 356b is driven upward, to a height that protrudes above the cover 203 (see FIG. 5) based on a deformation of the flexible membrane 257. At that time, the stretched or deformed the flexible membrane 257 conforms to a piston profile, creating a raised pixel 259. The piston profile is implemented in an arced shape.

The actuating module further includes contact terminals 358 configured to send a signal to the controller 180 by being electrically connected to each other, and the induction coil 356a may move in the chamber 255. Therefore, induction coil 356a moves to contact with the contact terminals 358 when flexible membrane 257 is pushed by a user. Referring to FIG. 7C, when the piston is forced downward and the flexible membrane 257 is pressed, the induction coil 356a and the piston 356b travel the full stroke to the bottom. Finally, the induction coil 356a or the piston 356b comes in contact with the contact terminals 358, and the signal is sent to the controller 180. However, the present invention is not only limited to this type of terminal, but also applicable to various structures of terminals. For example, the contact terminals 358 or the piston 356b may be changed by a switch. In that case, the switch is operated by pressing of the induction coil 356a.

Figure 8A:
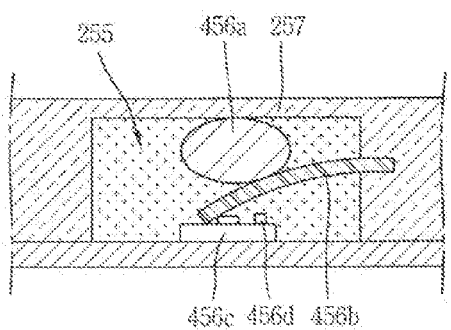
FIGS. 8A through 8C are cross-sectional views illustrating still another embodiment of a haptic device according to the present invention.
Figure 8B:
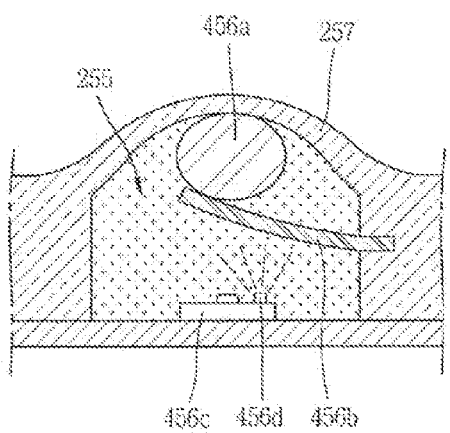
Figure 8C:
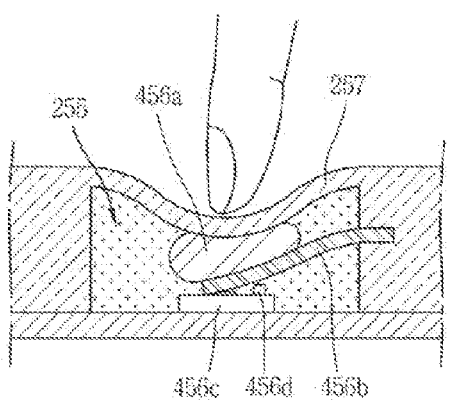

FIGS. 8A through 8C are cross-sectional views illustrating another embodiment of a haptic device according to the present invention. Referring to these figures, an actuating module includes an elastomer 456a and a supporting member 456b.

The elastomer 456a is a polymer with the property of elasticity. The term, which is derived from elastic polymer, is often used interchangeably with the term rubber. The elastomer 456a is disposed in the chamber 255, and the supporting member 456b is supported to the elastomer 456a. For example, the supporting member 456b is implemented in a cantilever. The elastomer 456a is located at a free end of the cantilever. The supporting member 456b is configured to raise the elastomer 456a toward the flexible membrane 257 when the current is applied into the supporting member 456b. Furthermore, the supporting member 456b is made of shape memory-alloy configured to change a deformed state to a natural state base on a heat generated by the energy conversion.

When the heat (or the current) is applied to the supporting member 456b, it shifts to its natural state and raises the elastomer 456a to create a protruded pixel 459 in the flexible membrane 257. When there is no current applied, the natural tension of the flexible membrane 257 bends the supporting member 456b downwards.

The actuating module further includes a switch board 456c configured to send a signal to the controller 180 (refer to FIG. 1) by pressing of the supporting member 456b. The supporting member 456b is deflected to press the switch board 456c when the supporting member 456b is depressed via the flexible membrane 257. Also, the switch board 456c can be change to a contact terminal that may come in contact with the supporting member 456b.

Even if there is no current in a state that the supporting member 456b is bended downward by the natural tension of the flexible membrane 257, the supporting member 456b does not yet press the switch board 456c. When depressed by a user, the supporting member 456b is deflected to the full travel, and presses the switch board 456c. The switch board 456c may be substituted with a terminal. When a switch of the switch board 456c is pressed or a circuit is closed by contacting with the terminal, a signal is sent to the controller 180.

Referring to FIGS. 8A through 8C, optical sources 456d are disposed in the haptic device. For example, optical sources 456d may be LED, OLED or LD (laser diode) and is mounted at the switch board 456c. The controller 180 is configured to control the optical sources 456d to emit light when the at least one of haptic modules reacts to the touch input. In more detail, when supporting member 456b shifts to its natural state and raises the elastomer 456a, optical sources 456d are operated to emit light. In this case, the flexible membrane 257 is made of transparent material. That's why a user can feel visible effects.

Figure 9:
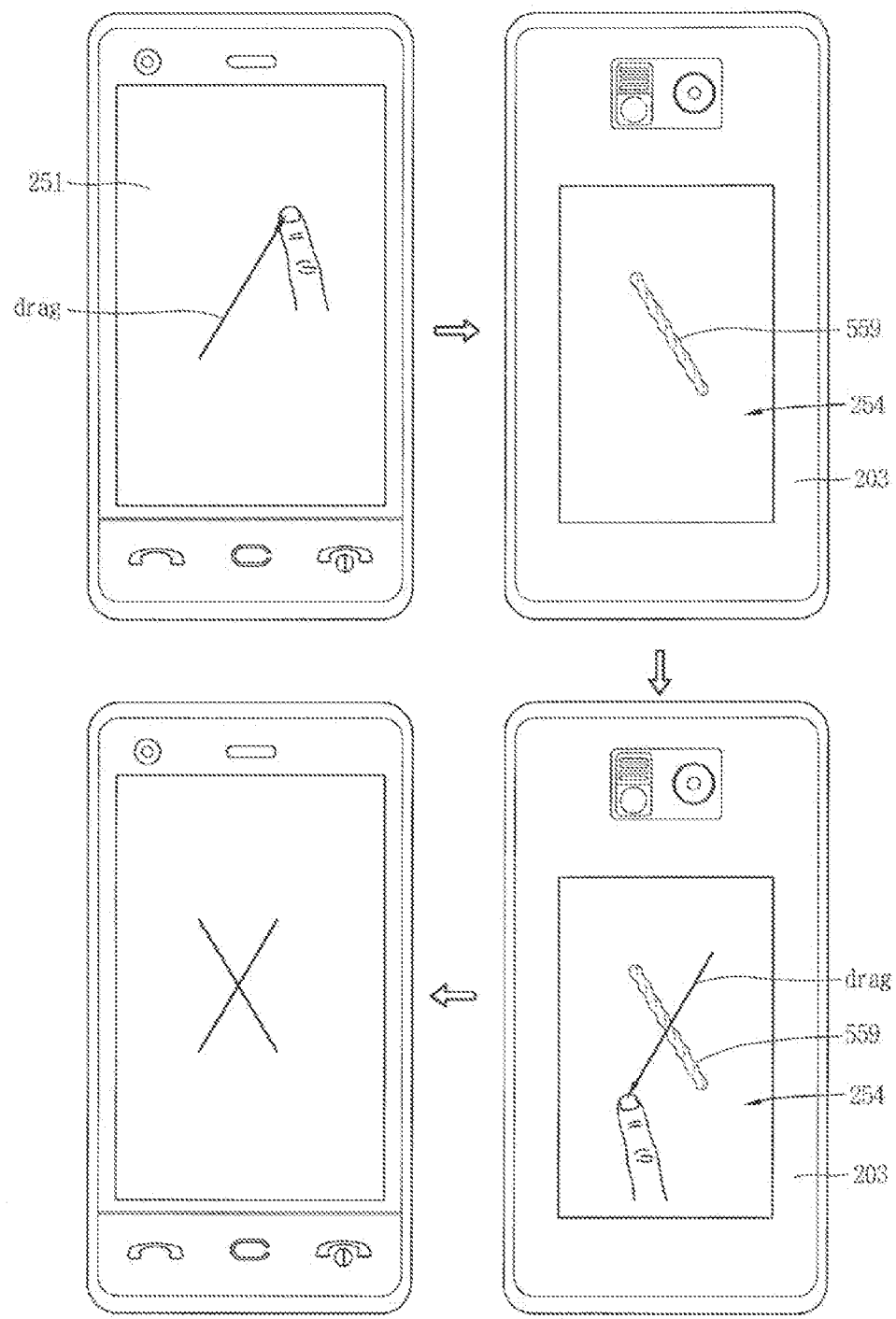
FIGS. 9 and 10 are conceptual views illustrating a user interface according to another embodiment of the present invention.
Figure 10:
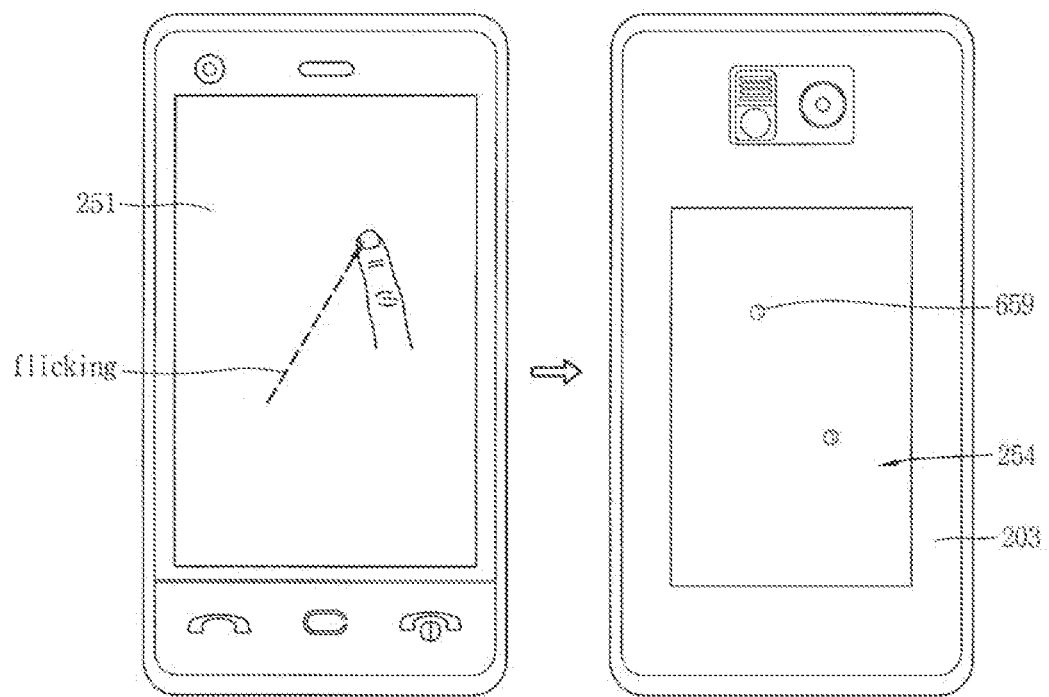

FIGS. 9 and 10 are conceptual views illustrating a user interface according to another embodiment of the present invention. The user interface is configured to conduct various haptic functions based on a type of touch input.

As shown in FIG. 9, when a user drags a finger on the display module 251, continuous protruded pixels 559 may be formed at the cover 203 along the dragging direction. When the touch input is dragged to the right side of the display module 251, each protruded pixel of the continuous protruded pixels 559 is formed in a sequence to the right side of the cover 203.

On the other hand, the user can input a control demand based on dragging on the cover 203. For example, when the user drags the finger on the cover 203, a line corresponding to a dragging path may be displayed on the display module 251. Firstly, visible information, for example '/', is displayed on the display module 251 and continuous protruded pixels 559 are generated on the cover 203 via the drag input on the display module 251. Next, if the user drags the finger on the cover 203 in a state that continuous protruded pixels 559 sustain their shape or come back to an original state that the flexible membrane 257 does not expand, an output (for example 'X') may be appeared on the display module 251. A combination of inputs to the display module 251 and the cover 203, new visible information is displayed on the display module 251.

Referring to FIG. 10, if a specific touch input is detected, the controller 180 (refer to FIG. 1) determines which control command the haptic device 254 performs. When a user flicks a finger on the display module 251, non-continuous protruded pixels 659 may be formed at the cover 203 along the flicking direction. For example, protruded pixels 659 may have protrusions corresponding to a start point and end point of the flicking.

Figure 11:
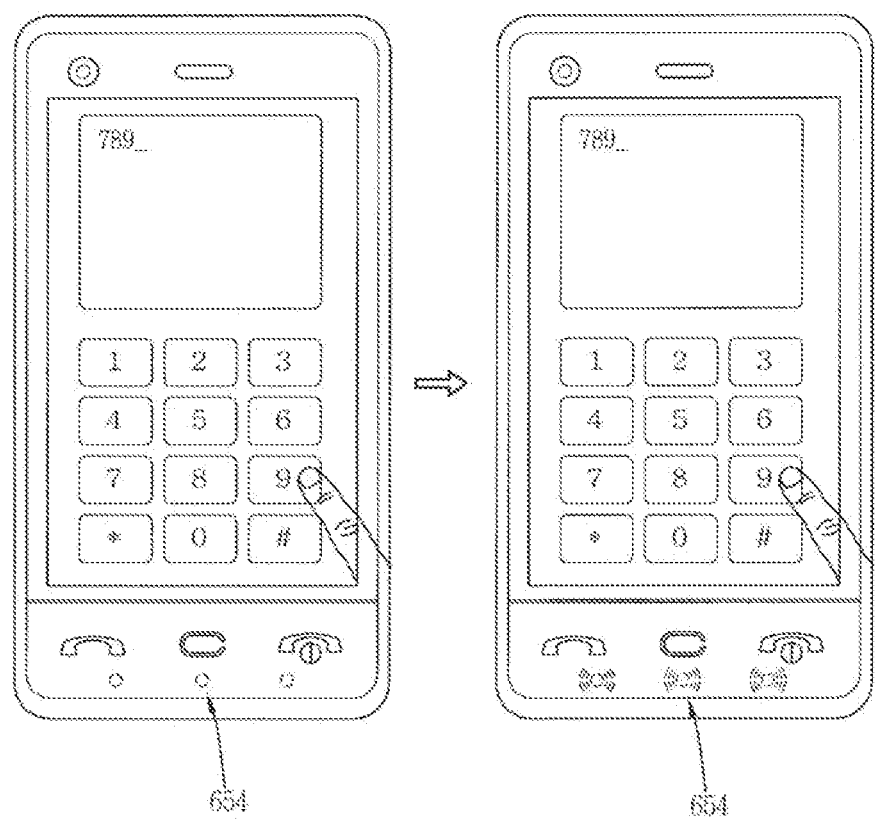
FIG. 11 is conceptual view illustrating another operation example of a mobile terminal according to the present invention.
Figure 12:
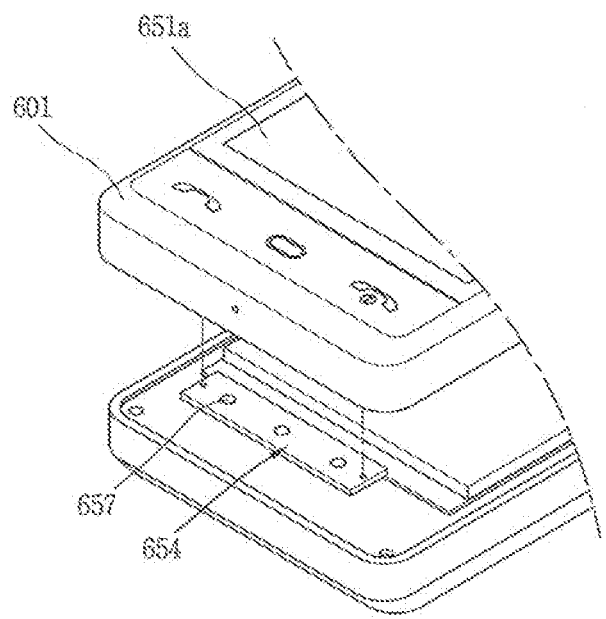
FIG. 12 is an exploded view of the mobile terminal of FIG. 11.

FIG. 11 is conceptual view illustrating another operation example of a mobile terminal according to the present invention, and FIG. 12 is an exploded view of the mobile terminal of FIG. 11.

In this embodiment, a haptic device 654 is mounted to face the front case 601 of the body. Each haptic module is disposed in a case of the body, and configured to press the front case

601 or a window 651*a* mounted at the front case 601 when a touch sensor senses the touch input. Further, a flexible membrane 657 is located to face an inner surface of the front case 601.

The controller 180 (refer to FIG. 1) is configured to feed a current to at least one of the haptic modules in a several times when the touch sensor senses the touch input, which allows the user to feel vibration effects as a haptic function. For enhanced vibration effects, haptic modules can arrange themselves linearly.

Figure 13A:
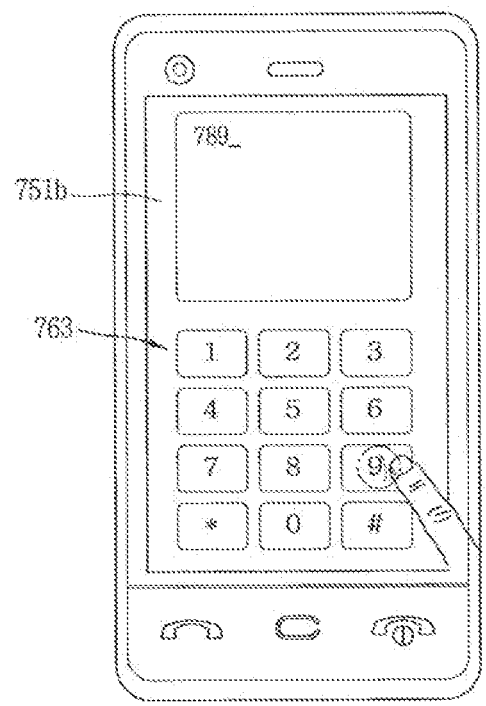
FIGS. 13A and 13B are conceptual views illustrating still another operation example of a mobile terminal according to the present invention.
Figure 13B:
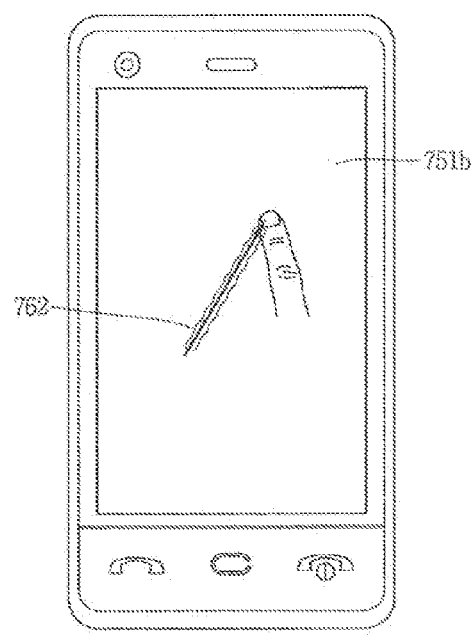
Figure 14:
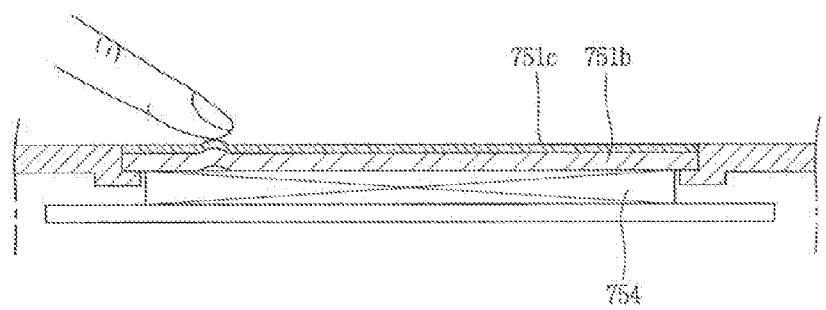
FIG. 14 is a cross-sectional view illustrating the mobile terminal in FIG. 13A.

FIGS. 13A and 13B are conceptual views illustrating another operation example of a mobile terminal according to the present invention, and FIG. 14 is cross-sectional views illustrating the mobile terminal in FIG. 13A.

As shown in FIG. 14, the display module includes a flexible display 751*b* for outputting visible information. A flexible membrane 757 is disposed below the flexible display 751*b* so as to press the flexible display 751*b* when a touch sensor 751*c* senses a touch input. The flexible display 751*b* is combined with a surface of the front case instead of a window and the touch sensor 751*c* is mounted at the flexible display 751*b*.

The touch sensor 751*c* senses a touched position when the flexible display 751*b* is touched, and the haptic modules are controlled by the controller 180 (refer to FIG. 1) so as to output information associated with the touched position on the flexible display 751*b*.

Referring to FIG. 13A, the flexible display 751*b* is protruded at a touched position when the touch sensor 751*c* detects the touch input. On these configurations, a user can see a protrusion from the touched position of the flexible display 751*b*. Further, the flexible display 751*b* is configured to display a virtual keyboard 763 and the haptic modules are disposed below the virtual keyboard 763. The haptic modules are configured to press a key of the virtual keyboard 763 corresponding to a touched position as a reaction of the touch input. If a user touches the key of the virtual keyboard 763, the key shoots up in a vertical direction.

Referring to FIG. 13B, a touch path 762 is protruded at the flexible display 751*b* based on a change of the touched position and a reaction of the haptic modules corresponding to the touch input. When a user drags a finger on the flexible display 751*b*, protrusions are formed continuously along a drag path. The protruded image information is displayed on the flexible display 751*b* in the form of an image that can be recognized by the user.

Figure 15A:
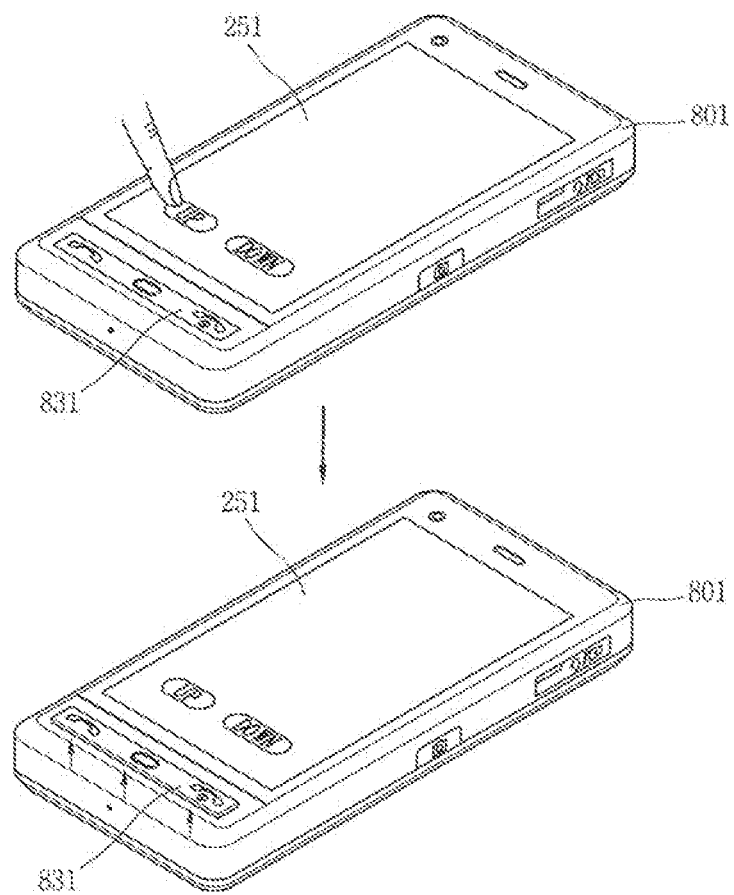
FIGS. 15A and 15B are conceptual views illustrating still another operation example of a mobile terminal according to the present invention.
Figure 15B:
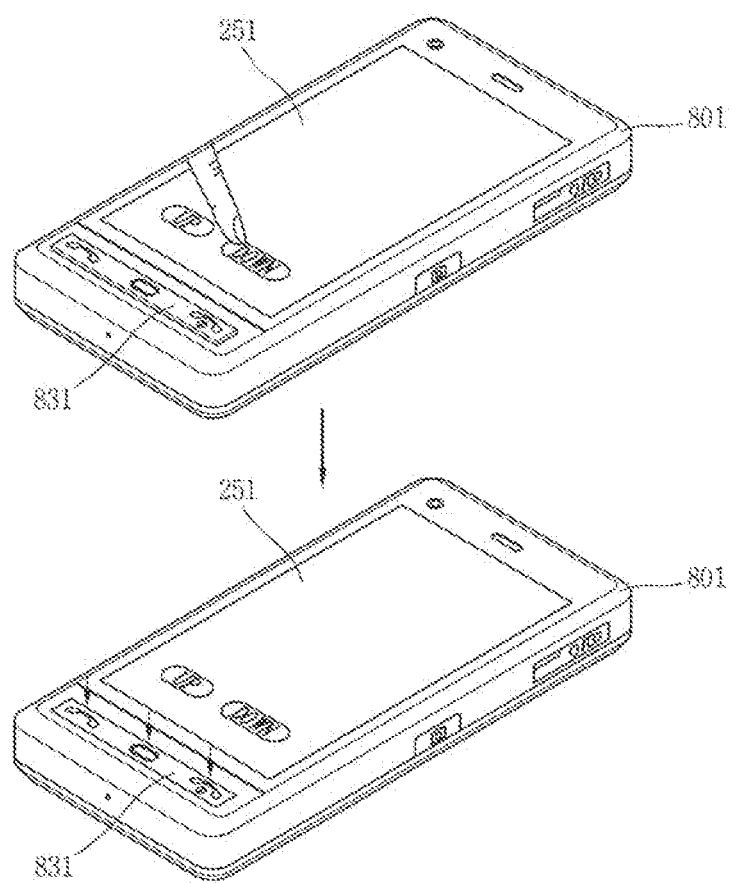
Figure 16:
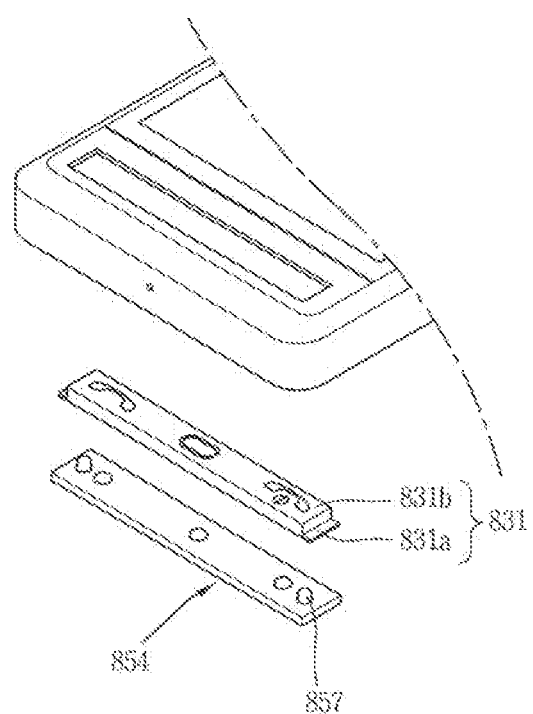
FIG. 16 is an exploded view of the mobile terminal of FIG. 15A.

FIGS. 15A and 15B are conceptual views illustrating still another operation example of a mobile terminal according to the present invention, and FIG. 16 is an exploded view of the mobile terminal of FIG. 15A.

A moving unit 831 is movably mounted at a case of the body, and a haptic device 854 is covered by the moving unit 831. The moving unit 831 is configured to receive a push input. For example, moving unit 831 may be formed, either at the front case 801 or the other case. The moving unit 831 may be disposed at corresponding positions in the non-transparent region of the window 251*a* (see FIG. 4). Also moving unit 831 may be, for example, a side key.

As shown in FIG. 16, the moving unit 831 includes a moving member 831*a* and at least one push key 831*b*. The moving member 831*a* is disposed at front case 801 of the body. The at least one push key 831*b* is mounted at the moving member 831 and configured to receive a push input by a user. Each push key 831*b* can be implemented as a combination of a key pad and a dome switch.

A flexible membrane of 857 is located to support the moving member 831*a*. Referring to FIGS. 15A and 15B, when icons corresponding to controls of the moving member 831*a* are displayed on a display module 851 and an icon (displayed 'up') is touched by the user, the haptic device 854 is operated. Therefore, the moving member 831*a* rises from the front case 801. In that case, current is applied to haptic modules continuously so as to keep in a rising state that the moving member 831*a* rises up. When another icon (displayed 'down') is touched by the user, the current is removed and the moving member 831*a* moves from the rising state to an original state. On these features, a new user interface which is different from the prior art may be implemented.

According to the present invention having the foregoing configuration, the haptic device is operated based on an energy conversion, thereby allowing the haptic device to be implemented in a matrix. Furthermore, through this, it is possible for the haptic device to function more user-friendly.

In addition, according to the present invention, the protruded pixel may be formed at an appearance of a mobile terminal, which allows the haptic device to enhance tactile effects and output visible effects. Also, a new user interface may be implemented through the visible effects.

Furthermore, according to the present invention, a signal generated by the haptic device is sent to the controller, thereby communication between the controller and the haptic device can be not mono-directional but also bi-directional.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile terminal, comprising:
a terminal body including a display module;
a touch sensor disposed to overlap the display module and configured to be touch sensitive;
haptic modules mounted at the body; and
a controller configured to feed a current to at least one of the haptic modules when the touch sensor senses a first touch input,
wherein each haptic module comprises:
a chamber covered by a flexible membrane; and
an actuating module accommodated in the chamber and configured to press the flexible membrane based on an energy conversion of the current such that the flexible membrane is expanded,
wherein first visible information associated with the first touch input is displayed on the display module in response to the first touch input,
wherein a protrusion of the haptic modules is protruded in response to the first touch input, the protrusion of the haptic modules mirroring the first visible information displayed on the display module,
wherein the haptic modules are configured to detect a second touch input applied to at least part of the haptic modules,
wherein second visible information associated with the second touch input is displayed on the display module in response to the second touch input, the second visible information displayed on the display module mirroring the second touch input detected by the haptic modules, and
wherein new visible information is displayed on the display module through a combination of the first visible information and the second visible information.

2. The terminal according to claim 1, wherein the actuating module includes:

a phase-change material filled in the chamber;
a heating element accommodated in the chamber, and configured to heat the phase-change material based on the energy conversion; and
a metal member disposed in the chamber so as to cool the phase-change material when the feeding of the current is stopped.

3. The terminal according to claim 2, wherein the actuating module further includes contact terminals configured to send a signal to the controller when the contact terminals are electrically connected to each other.

4. The terminal according to claim 3, wherein the metal member is configured to be movable in the chamber such that the contact terminals are electrically connected or disconnected to each other.

5. The terminal according to claim 2, wherein the heating element is configured to make an instantaneous phase change of the phase-change material from a liquid to a gas when the current is applied to the heat element.

6. The terminal according to claim 1, wherein the actuating module includes:
an induction coil accommodated in the chamber and configured to generate a magnetic force when the current is fed thereinto; and
a piston disposed in the induction coil, and configured to move so as to press the flexible membrane based on the magnetic force.

7. The terminal according to claim 6, wherein the actuating module further includes contact terminals configured to send a signal to the controller by being electrically connected to each other, and
wherein the piston is configured to press the flexible membrane when the piston is driven upward and to contact with the contact terminal when the piston is forced downward.

8. The terminal according to claim 1, wherein the actuating module includes:
an elastomer disposed in the chamber; and
a supporting member supported to the elastomer and configured to raise the elastomer toward the flexible membrane when the current is applied thereinto.

9. The terminal according to claim 8, wherein the supporting member is made of shape memory-alloy configured to change a deformed state to a natural state based on a heat generated by the energy conversion.

10. The terminal according to claim 9, wherein the actuating module further includes a switch board configured to send a signal to the controller by pressing of the supporting member, and
wherein the supporting member is deflected to press the switch board when the supporting member is depressed via the flexible membrane.

11. The terminal according to claim 1, wherein the body includes a front side and a rear side, the display module is positioned to be viewable from the front side of the body, and the haptic modules are arranged on the rear side in a matrix form.

12. The terminal according to claim 11, wherein a haptic module close to a touched position among the haptic modules reacts to the first touch input.

13. The terminal according to claim 1, wherein each of the haptic modules is disposed in a case of the body, and configured to press the case or a window mounted at the case when the touch sensor senses the first touch input.

14. The terminal according to claim 1, wherein a moving unit is movably mounted at a case of the body, and the haptic modules are covered by the moving unit.

15. The terminal according to claim 14, wherein the moving unit is configured to receive a push input.

16. The terminal according to claim 1, wherein the display module includes a flexible display for outputting visible information and the flexible membrane is disposed below the flexible display so as to press the flexible display when the touch sensor senses the first touch input.

17. The terminal according to claim 16, wherein the touch sensor senses a touched position when the flexible display is touched, and the haptic modules are controlled by the controller so as to output information associated with the touched position on the flexible display.

18. The terminal according to claim 17, wherein a touch path is protruded at the flexible display based on a change of the touched position and a reaction of the haptic modules corresponding to the first touch input.

19. The terminal according to claim 16, wherein the flexible display is configured to display a virtual keyboard, and
wherein the haptic modules are disposed below the virtual keyboard, and configured to press a key of the virtual keyboard corresponding to a touched position as a reaction of the first touch input.

20. A mobile terminal, comprising:
a body including a front side and a rear side;
a display module positioned to be viewable from the front side of the body;
a touch sensor disposed to overlap the display module and configured to be touch sensitive; and
a haptic device including haptic modules arranged on the rear side of the body in a matrix form, wherein the haptic device is controlled such that at least one of the haptic modules reacts to a first touch input,
wherein first visible information associated with the first touch input is displayed on the display module in response to the first touch input,
wherein a protrusion of the haptic modules is protruded in response to the first touch input, the protrusion of the haptic modules mirroring the first visible information displayed on the display module,
wherein the haptic modules are configured to detect a second touch input applied to at least part of the haptic modules,
wherein second visible information associated with the second touch input is displayed on the display module in response to the second touch input, the second visible information displayed on the display module mirroring the second touch input detected by the haptic modules, and
wherein new visible information is displayed on the display module through a combination of the first visible information and the second visible information.

21. The terminal according to claim 20, wherein the haptic device is sized to be proportional to the display module or to overlap the display module.

22. The terminal according to claim 21, wherein each haptic module comprises:
a chamber covered by a flexible membrane, wherein the flexible membrane is disposed at the rear side; and
an actuating module accommodated in the chamber and configured to press the flexible membrane such that the flexible membrane is expanded.

23. The terminal according to claim 20, further comprising:
optical sources disposed in the haptic device; and
a controller configured to control the optical sources to emit light when the at least one of the haptic modules reacts to the first touch input.

* * * * *